(12) United States Patent
Nilsson

(10) Patent No.: US 6,865,171 B1
(45) Date of Patent: Mar. 8, 2005

(54) METHODS AND APPARATUS FOR SELECTIVELY PROVIDING USER-SPECIFIC INFORMATION TO ORIGIN SERVERS IN WIRELESS APPLICATION PROTOCOL APPLICATIONS

(75) Inventor: Mikael Nilsson, Karlstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 840 days.

(21) Appl. No.: 09/639,936

(22) Filed: Aug. 17, 2000

Related U.S. Application Data (60) Provisional application No. 60/160,866, filed on Oct. 22, 1999.

(51) Int. Cl.[7] .................................................. H04Q 7/24
(52) U.S. Cl. ........................................ 370/338; 370/349
(58) Field of Search ................................. 370/328, 338, 370/401, 466, 351–356, 465, 349; 709/208, 203

(56) References Cited

U.S. PATENT DOCUMENTS

| | | | | |
|---|---|---|---|---|
| 6,272,129 B1 | * | 8/2001 | Dynarski et al. | ............ 370/356 |
| 6,356,529 B1 | * | 3/2002 | Zarom | ......................... 370/231 |
| 6,466,783 B2 | * | 10/2002 | Dahm et al. | ............. 455/414.2 |
| 6,549,773 B1 | * | 4/2003 | Linden et al. | ........... 455/426.1 |

* cited by examiner

*Primary Examiner*—Ajit Patel (57) ABSTRACT

A meta markup language (e.g., an adaptation of XML) includes a specific tag which is optionally sent from a Wireless Application Protocol (WAP) terminal when issuing requests aimed at a network origin server. The specific tag can be replaced by an intermediary WAP proxy or WAP gateway so that user-specific information can be inserted into the request at the discretion of a terminal user. Exemplary embodiments thus give WAP terminal users complete control over whether certain, potentially sensitive, information is transmitted to a network origin server during a request.

21 Claims, 7 Drawing Sheets

METHODS AND APPARATUS FOR SELECTIVELY PROVIDING USER-SPECIFIC INFORMATION TO ORIGIN SERVERS IN WIRELESS APPLICATION PROTOCOL APPLICATIONS

This application claims priority under 35 U.S.C. §§119 and/or 365 to U.S. Provisional application No. 60/160,866 filed in the U.S. Patent and Trademark Office on Oct. 22, 1999; the entire content of which is hereby incorporated by reference.

PRIORITY APPLICATION

The present application claims priority from U.S. Provisional Patent Application No. 60/160,866, entitled "Extensible Position Meta Markup Language" and filed Oct. 22, 1999, which is incorporated herein in its entirety here by reference.

BACKGROUND

Radiocommunications are rapidly becoming a primary communication technology for many people around the world. Mobile phones, wireless personal digital assistants and pagers are only a few examples of end user devices employed in radiocommunication systems to provide rapid and convenient communication services to subscribers. With the advent of the Internet, wireless access to, for example, the World Wide Web is widely anticipated as the next generation of radiocommunication systems are being developed. Naturally, such next generation systems are intended to provide greater throughput to support high bandwidth data communications. However, in addition to providing greater throughput, such new technologies invariably bring with them the opportunity for new services that can be offered to subscribers. In turn, these new services require the development of new capabilities between a user's wireless terminal (whatever form it may take), the fixed part of the radiocommunication system which is supporting wireless communications with that terminal and other networks that are accessed as a result of such communications (e.g., the Internet), as part of the implementation of the service. Accordingly, another challenge facing next generation designers is to implement and refine new capabilities to provide the building blocks for services to be implemented in next generation systems.

An example of a new service which is certain to be implemented as, for example, a wireless Internet application is the provision of specific content to a terminal based upon some terminal characteristic, e.g., the subscription associated with the terminal or the terminal's position. For example, a service could be implemented to provide a list of hotels or restaurants which are close to the wireless terminal's current position. To enable such a service, it may be useful to transmit user-related information (e.g., hotel/restaurant preference, the terminal's position, etc.) to an origin server which can then generate and return content specifically adapted to the user or terminal.

This type of service can be implemented using the recently developed Wireless Application Protocol (WAP), and more particularly, by exchanging terminal position and other information between and among WAP terminals, gateways and servers. For general information regarding WAP, the interested reader is referred to http://www.wapforum.org/, the contents of which are incorporated here by reference, since only certain WAP details of interest for understanding the present invention are mentioned here. For example, the User Agent Profile defined by the WAP Forum Applications group includes a mechanism which allows for the transmission of position information based on the Extensible Markup Language (XML) application Resource Description Framework (RDF). More information regarding WAP User Agent Profiles can be found at http://www1.wapforum.org/tech/documents/SPEC-UAProf-19991110.pdf, the contents of which are incorporated hereby reference. Moreover, a more detailed example of how these WAP functions conventionally operate to provide position information is provided below with respect to FIGS. 1 and 2. Briefly, however, using a conventional WAP approach, the position attribute is appended to the User Agent profile under the control of a gateway server, even when the position information is not required for the request sent by the user of the terminal device. As a result, the use of position information is inflexible, and the terminal user, or client, is unable to control whether position or other user-specific information is provided to an origin server as part of a request for information.

Thus, there is a need for improved methods and apparatus for exchanging position and other user-specific information between and among WAP terminals, gateways and servers.

SUMMARY

The present invention fulfills the above-described and other needs by defining a meta markup language (e.g., by adaptation of XML) in which a specific tag is optionally sent from a terminal when issuing requests aimed at an origin server. According to exemplary embodiments of the invention, the specific tag can be replaced by an intermediary WAP proxy or gateway so that the position of the terminal device can be inserted into the request at the discretion of the terminal user. Advantageously, the present invention permits applications that are unaware of the WAP User Agent Profile to utilize position information, and gives users complete control over whether current position (or other user-related or terminal-related) information is transmitted to an origin server during a request.

The above-described and other features and advantages of the invention are explained in detail hereinafter with reference to the illustrative example shown in the accompanying drawings. Those skilled in the art will appreciate that the described embodiments are provided for purposes of illustration and understanding and that numerous equivalent embodiments are contemplated herein.

DETAILED DESCRIPTION

The following detailed description provides a discussion of various exemplary embodiments which are intended to illustrate, rather than restrict, the scope of the present invention. Thus, reference to specific types of systems, circuits, etc. is intended only to provide an example of such features as they may be employed in conjunction with the present invention. Likewise, details regarding other system features, circuit schematics and the like that are well known to those skilled in the art are omitted to avoid obscuring the present invention.

Figure 1:
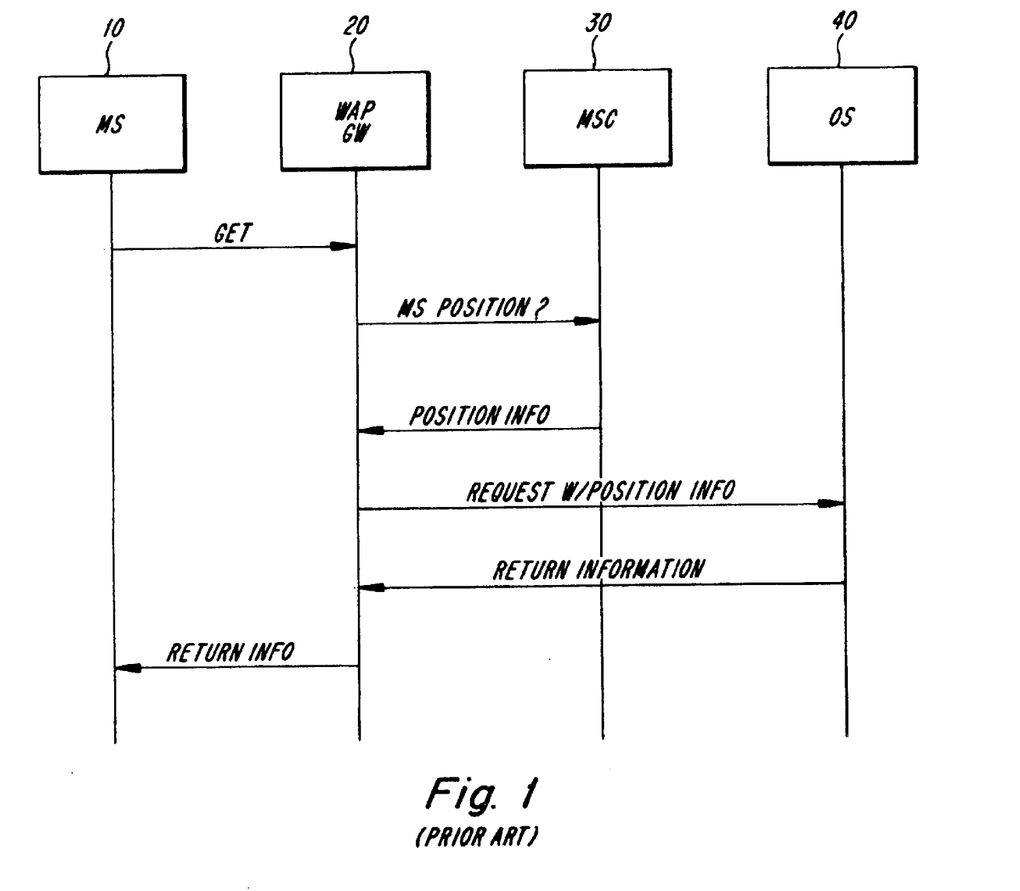
FIG. 1 is a signalling diagram depicting a conventional technique for informing an origin server of a terminal's position using WAP techniques.

As mentioned above, conventional application of WAP techniques to provide position information as part of a request for information by a wireless terminal device does not result in sufficient user control over the provision of the position information. Generally speaking, a wireless terminal's position can be determined either by the fixed portion of the radiocommunication system (e.g., using the Mobile Positioning System (MPS)), by the terminal itself (e.g., using a GPS receiver) or by an adjunct system. FIG. 1 is a signalling diagram which provides an example of the former type wherein terminal position information is determined by the system and appended automatically to requests from a terminal by a WAP gateway.

Therein, a wireless terminal, e.g., a mobile station (MS), 10 transmits a GET request to obtain information from a data source represented by origin server (OS) 40. More details regarding exemplary GET requests are provided below with respect to FIG. 3. The GET request is received by a WAP gateway 20, which then automatically queries a mobile switching center (MSC) 30 to obtain position information associated with that terminal. Such position information can be obtained via any of a number of known techniques, e.g., deriving direction-of-arrival (DOA) information from received signal strengths on a number of antenna array elements and performing triangulation. Regardless of the particular positioning scheme employed by the system, the MSC 30 returns the position information to the WAP gateway 20, which in turn appends it to the WAP User Agent Profile. The WAP User Agent then queries OS 40 for the requested information. The appended position information may, or may not, be used in obtaining the requested information. Information is returned to the WAP Gateway 20, wherein it is reformatted for transmission over the air interface to MS 10.

Figure 2:
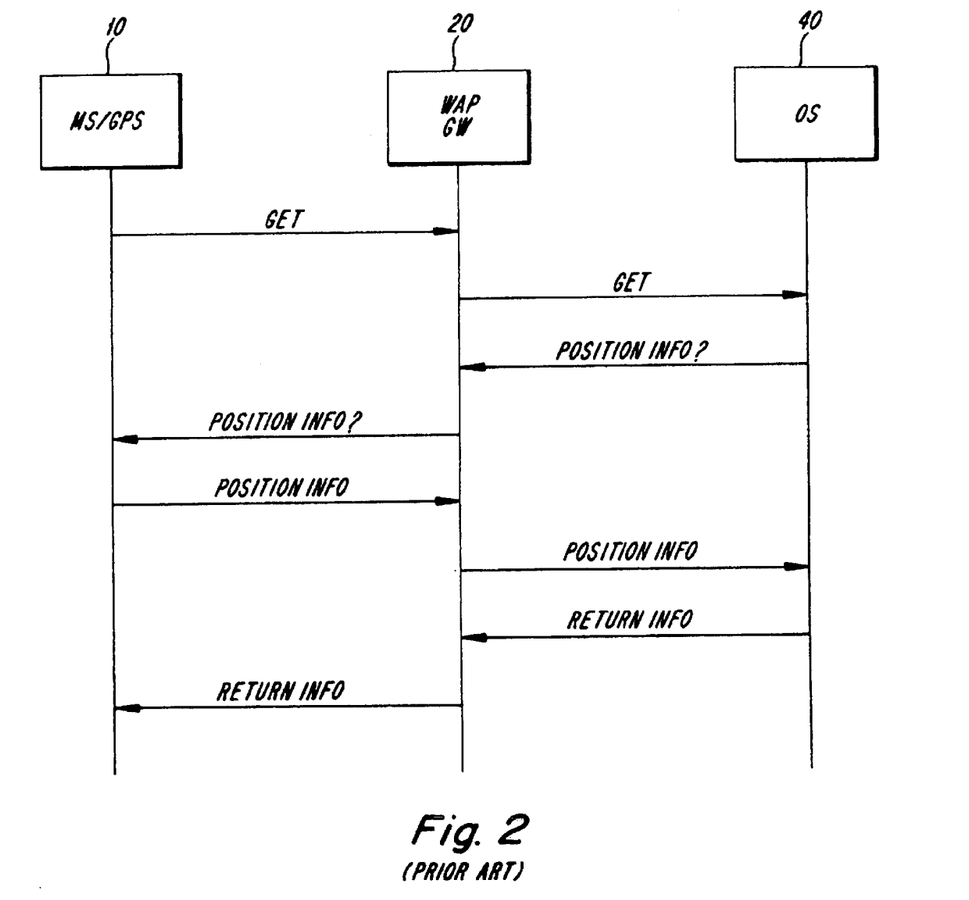
FIG. 2 is a signalling diagram depicting another conventional technique for informing an origin server of a terminal's position using WAP techniques.

Similar signalling occurs when MS 10 provides its own position information as described in FIG. 2. Therein, the MS 10 now includes a Global Positioning Satellite (GPS) receiver so that it can determine its own position. Once again, the process begins with the MS/GPS 10 signalling the WAP gateway 20 with a request for information. In this example of conventional WAP functionality, the GET request is forward to the OS 40 which can request the position information. If the OS 40 requests position information, as seen in this example, several signals are required to obtain the position information from MS 10 and return that information to the OS 40. The OS 40 then obtains the requested information, e.g., from the Internet, and returns it (via WAP gateway 20) to the MS 10.

As will be appreciated by those skilled in the art, neither of these conventional WAP implementations provides for the user or the terminal to control dissemination of the user-specific and/or information, in these examples position information, to the origin server. Thus exemplary embodiments of the present invention address this shortcoming.

Figure 3:
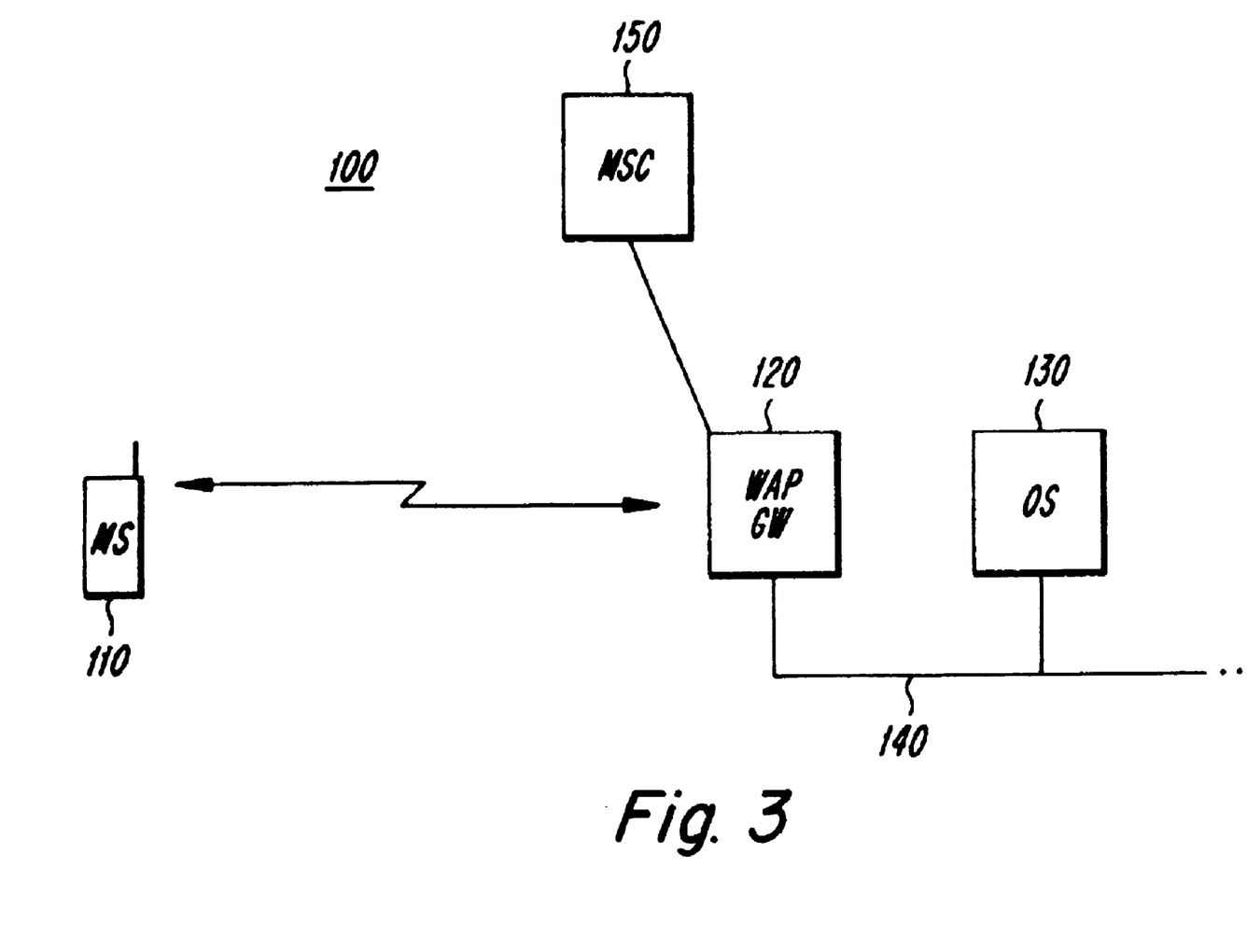
FIG. 3 depicts an exemplary communications system in which the teachings of the present invention can be implemented.

In FIG. 3, an exemplary communications system 100 in which the present invention can be implemented includes a WAP terminal 110 (e.g., a mobile station operating in a wireless communications system), a WAP gateway 120, and a network origin server 130. As shown, the WAP terminal 110 is in wireless communication with the WAP gateway 120, and the WAP gateway 120 is in communication with the origin server 130 via a network 140. Those skilled in the art will appreciate that the air interface between the WAP terminal 110 and the WAP gateway 120 can be any known interface, including the Global System for Mobile Communications (GSM), the Digital Advanced Mobile Phone System (DAMPS), the Personal Digital Cellular (PDC) system, etc. Those skilled in the art will further appreciate that the network 140 can be implemented using any known hardware configuration (e.g., an Ethernet connection).

In operation, the WAP terminal 110 and the WAP gateway 120 communicate using the WAP protocol over the air interface, while the gateway 120 and the origin server 130 communicate via a network protocol (e.g., the well known TCP/IP protocol used in implementing the Internet). The gateway 120 thus acts as an intermediary, or client proxy, between the WAP terminal 110 and the network origin server 130.

For communications from the WAP terminal 110 to the origin server 130, the WAP gateway 120 terminates the WAP protocol stack and transforms the WAP communication into an appropriate network protocol (e.g., TCP/IP) communication. Conversely, for communications from the origin server 130 to the WAP terminal 110, the WAP gateway 120 performs Wireless Markup Language (WML) encoding and script compilation to convert network protocol communications to WAP communications. The WAP gateway 120 can also be linked to other portions of the radiocommunication network (represented here by MSC 150), for example, in order to obtain position information for WAP terminal 110 which, in this exemplary embodiment, does not provide its own position information. According to one exemplary embodiment of the present invention, the WAP terminal 110 can issue a request (e.g., a Wireless Session Protocol, or WSP, GET request) to the origin server 130 as follows (where the origin server 130, e.g. a server capable of providing information regarding restaurants in the vicinity of the WAP terminal 110, is identified by an arbitrary Internet address www.wherever.com):

---

<Address of UAProfile:http://www.vendor.com/. . . />
<Address of OS: http://www. wherever. com/>
<. . . />
<. . . />
<POSITION UNKNOWN/>
GET/

---

The WAP gateway 120 can then parse the GET message to extract attribute data therefrom and reformat the message prior to issuing a request to OS 130. For example, WAP gateway 120 can convert the <POSITION UNKNOWN> tag in the GET request to the following form (where values x and y indicate, respectively, the actual latitude and longitude of the WAP terminal 110):

```
Position: Lat=x Long=y
Thereafter, the gateway 120 can issue a corresponding network protocol
(e.g., TCP/IP) request to the network origin server 130 as follows:
    Position: Lat= x Long= y
    GET /
```

Figure 6:
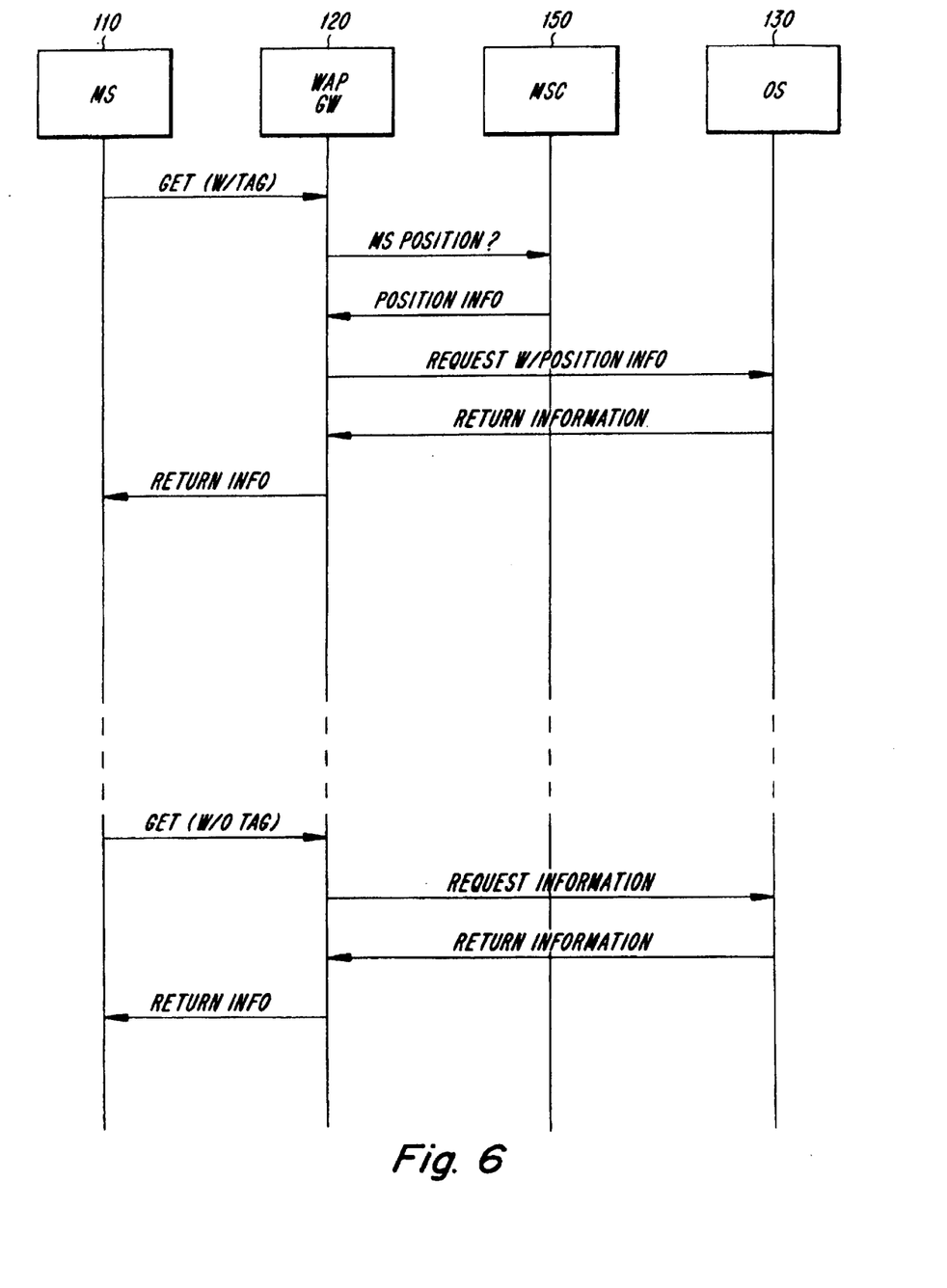
FIG. 6 is a signalling diagram illustrating signals associated with the methods described in FIGS. 4 and 5.

In this way, the terminal position information is transmitted to the origin server 130 during a request as desired by the user. However, if the <POSITION UNKOWN/> tag is omitted from the initial request, the gateway 120 will omit the position information, and the WAP terminal 110 can thereby prevent the position information from being sent to the origin server 130. A signalling diagram depicting the signalling for both cases (with and without tag) is appended as FIG. 6.

Figure 4:
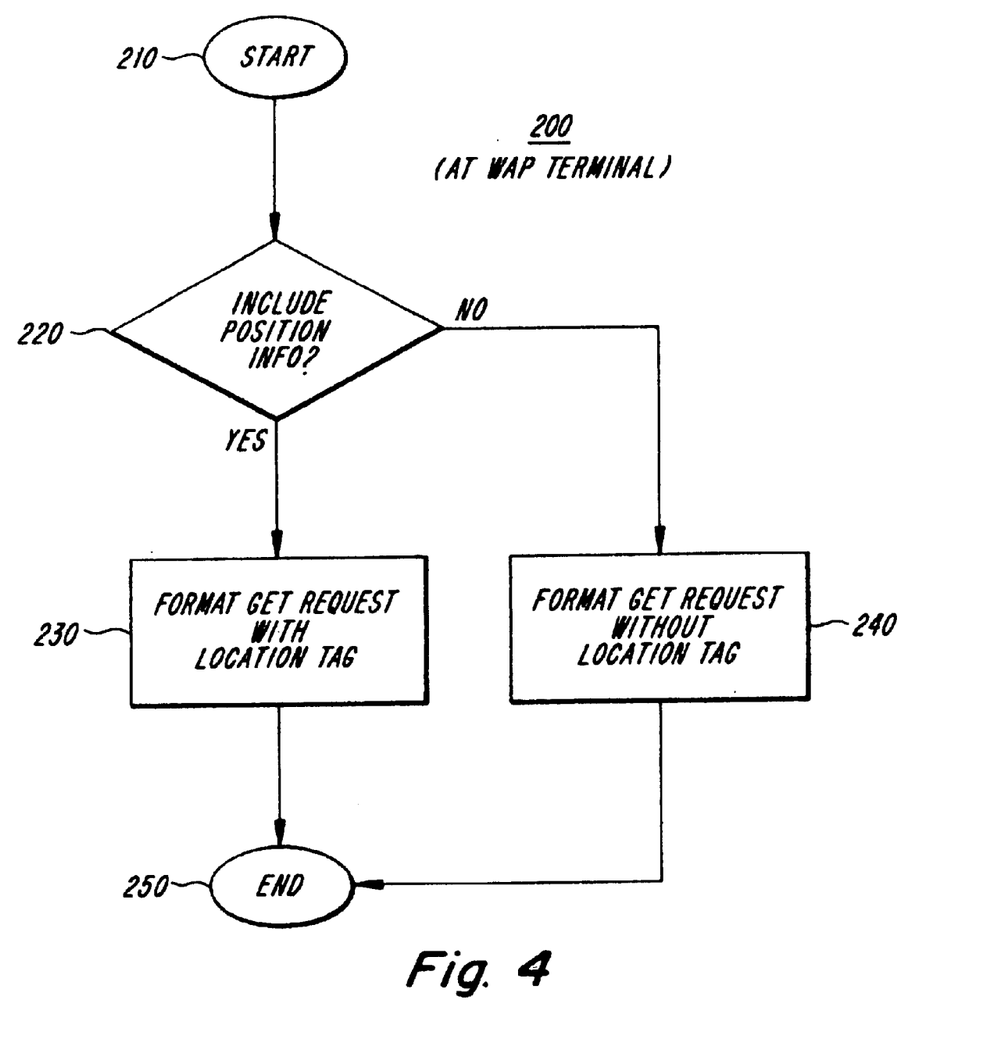
FIG. 4 depicts an exemplary method of generating a WAP terminal request, based on input from a WAP terminal user, according to the invention.

FIG. 4 depicts operation of the WAP terminal 110 in the above described technique according to the invention. More specifically, FIG. 4 depicts exemplary operation of a WAP application running on the WAP terminal 110. In the figure, it is presumed that the terminal user has initiated a GET request for which precise position information is optional (e.g., a request for restaurants in a particular geographic area, which could optionally be further refined or prioritized based on the user's precise position within the area). Thus, at step 220, the WAP terminal user is prompted (e.g., via presentation of a user query on a user display of the terminal 110, to which the user can respond, e.g., by keypad entry) as to whether he or she wishes to include position information with the GET request. If so, then the WAP application formats the GET request with the position information at step 230. If not, then the WAP application formats the GET request without the position information at step 240. In either case, the GET request is sent to a WAP gateway for processing and forwarding to an origin server as described above.

Figure 5:
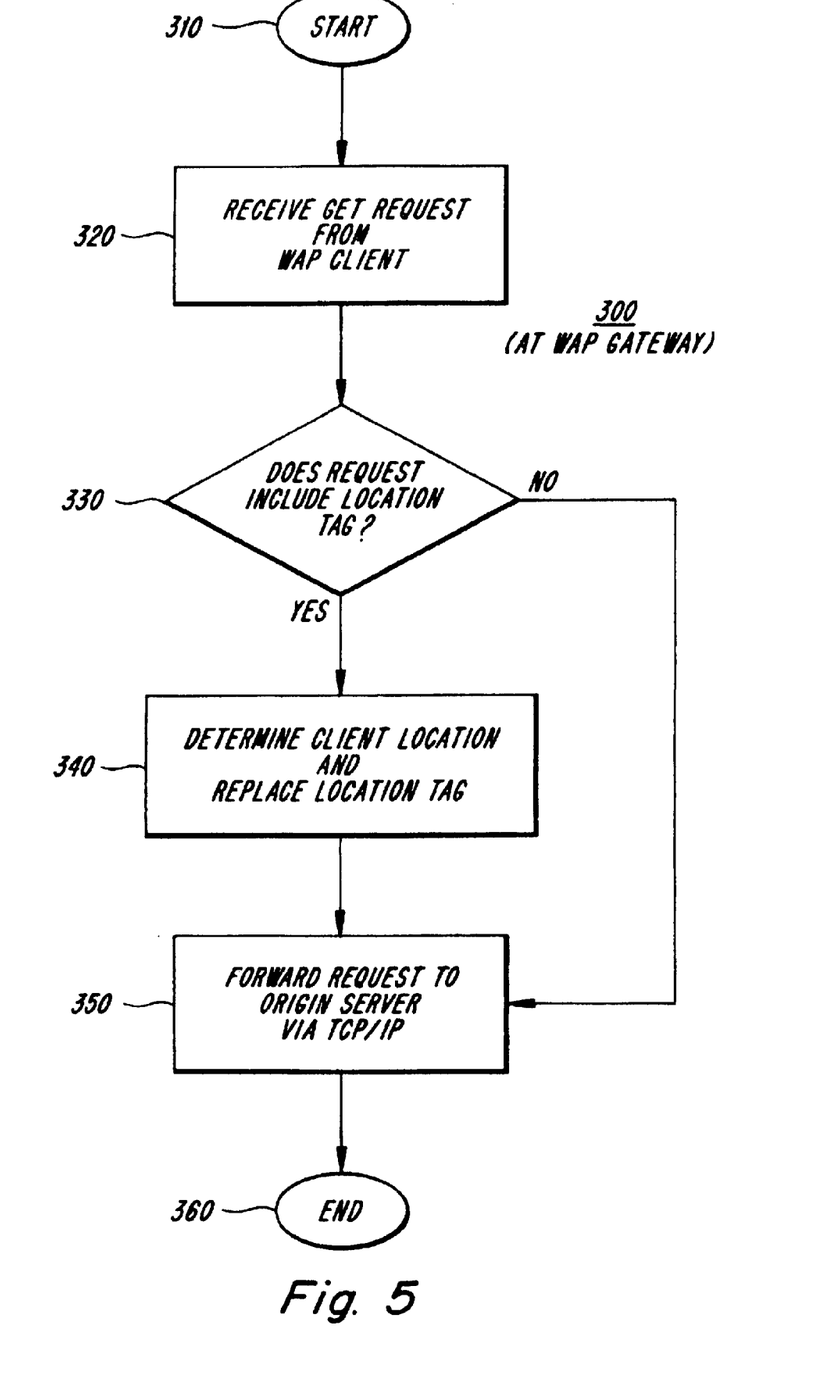
FIG. 5 depicts an exemplary method of processing a WAP terminal request, at a WAP gateway, according to the invention.

FIG. 5 depicts operation of the WAP gateway 120 in the above described technique according to the invention. As shown, the gateway 120 receives a WAP GET request from the WAP terminal 110 at step 320. Then, at step 330, the gateway 120 determines whether the GET request includes a position tag. If so, then the gateway 120 determines the actual position of the WAP terminal 110 (as described above) and modifies the request by replacing the position tag with the actual position data (step 340). Thereafter, the gateway 120 converts the request to an appropriate network protocol request and forwards it to the origin server 130 at step 350. If, however, the initial GET request from the WAP terminal 110 does not include a position tag, then the gateway 120 converts and forwards the request directly to the origin server 130, without first inserting the actual position data.

Figure 7:
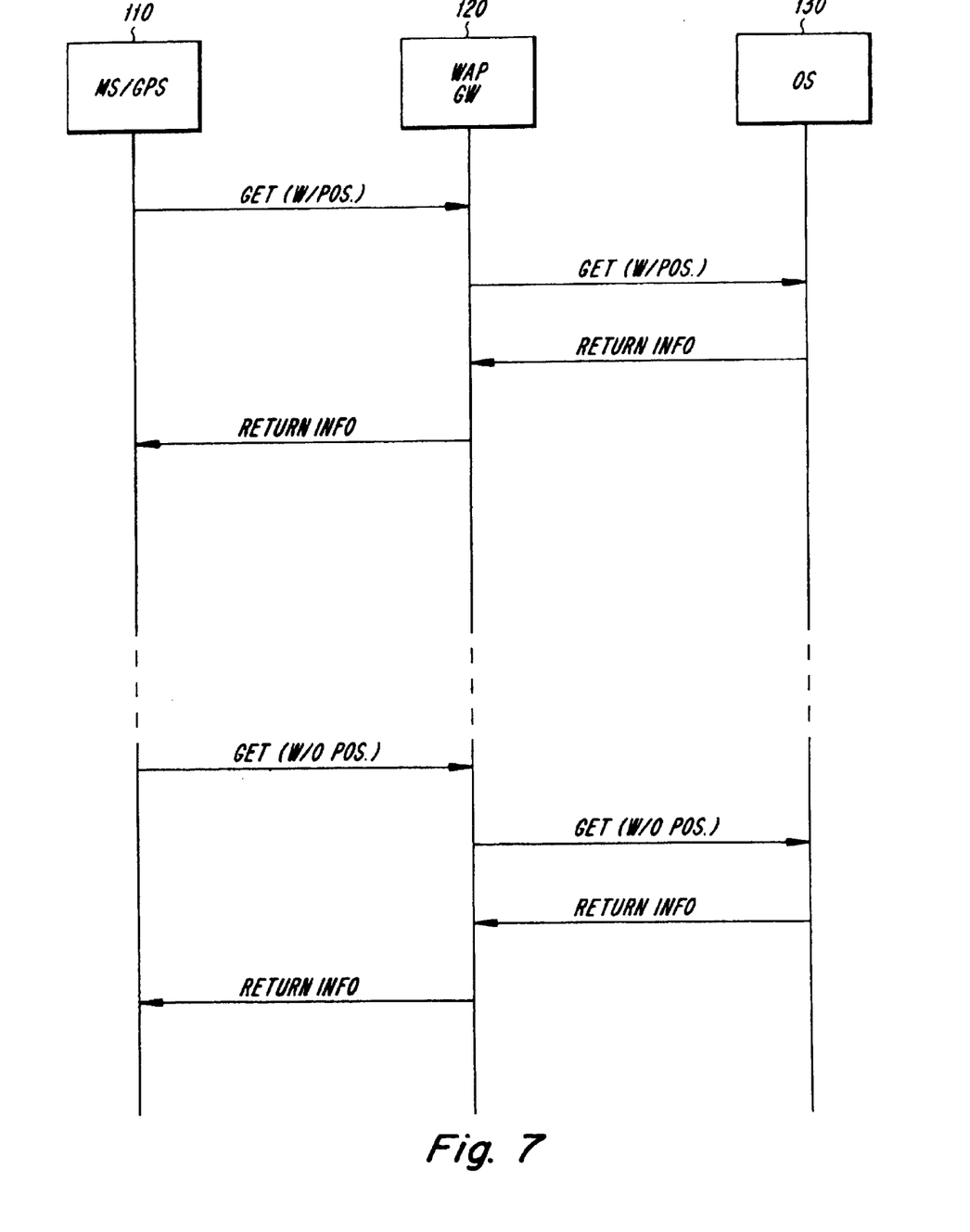
FIG. 7 is a signalling diagram illustrating signalling for an exemplary embodiment of the present invention wherein a WAP terminal includes a GPS receiver.

Although the foregoing examples of the present invention have been provided in the context of a WAP terminal 110 which does not determine its own position (e.g., via GPS) and, therefore, selectively adds a position tag to its GET request when position information is to be forwarded to the origin server 130, those skilled in the art will appreciate that the present invention can also be applied to situations wherein the WAP terminal 110 includes a GPS terminal and, therefore, is capable of providing its own position information. In such cases, the WAP terminal 110 will selectively include its own position information in the GET request instead of a tag if the user wishes for such information to be forwarded to the origin server. A signalling diagram for both cases (with and without position information) is illustrated as FIG. 7.

Those skilled in the art will appreciate that the present invention is not limited to the specific exemplary embodiments which have been described herein for purposes of illustration and that numerous alternative embodiments are also contemplated. For example, although the exemplary embodiments have been described with respect to position information, the invention can readily be used to selectively forward any user-specific meta data which is not available at a WAP terminal. For example, a WAP terminal user can specify whether a WAP gateway should determine and forward an A-number (i.e., a calling party number) to an origin server, or whether a WAP gateway should determine (e.g., by querying a subscriber database) and forward personal information regarding the user (e.g., gender, address, shoe size, etc.). The scope of the invention is therefore defined by the claims appended hereto, rather than the foregoing description, and all equivalents which are consistent with the meaning of the claims are intended to be embraced therein.

What is claimed is:

1. A communication system, comprising:
   a Wireless Application Protocol (WAP) terminal communicating, via a WAP gateway, with a network protocol origin server,
   wherein said WAP terminal selectively includes a tag in a request sent, via the WAP gateway, to the origin server, and
   wherein the WAP gateway, prior to forwarding the request from the WAP terminal to the origin server, modifies the request to include user-specific information when the tag is present.

2. The system of claim 1, wherein the tag is included in the request at the discretion of a user of the WAP terminal.

3. The system of claim 1, wherein the user-specific information is calling-party number associated with the WAP terminal.

4. The system of claim 1, wherein the user-specific information is prevailing geographic position of the WAP terminal.

5. The system of claim 4, wherein the request is a GET request, and wherein the origin server provides, in response to the GET request, content adapted to the prevailing position of the WAP terminal.

6. The system of claim 4, wherein the WAP gateway obtains the prevailing position of the WAP terminal from a wireless communications network in which the WAP terminal is operating.

7. The system of claim 6, wherein the WAP gateway obtains the prevailing position of the WAP terminal from a Mobile Switching Center (MSC) in the wireless communications network, and wherein the MSC obtains the prevailing position of the WAP terminal via one of a Global Positioning System (GPS) and a Mobile Positioning System (MPS).

8. A method of sending a request from a Wireless Applications Protocol (WAP) terminal, via a WAP gateway, to a network protocol origin server, comprising the steps of:
   selectively including a tag in the request at the terminal;
   forwarding the request from the terminal to the gateway;
   modifying the request, at the gateway, to include user-specific information when the tag is present in the request; and
   forwarding the request from the gateway to the server.

9. The method of claim 8, wherein the tag is included in the request at the discretion of a user of the WAP terminal.

10. The method of claim 8, wherein the user-specific information is calling-party number associated with the WAP terminal.

11. The method of claim 8, wherein the user-specific information is prevailing geographic position of the WAP terminal.

12. The method of claim 11, wherein the request is a GET request, and wherein the origin server, in response to the GET request, returns content adapted to the prevailing position of the WAP terminal.

13. The method of claim 11, wherein the WAP gateway obtains the prevailing position of the WAP terminal from a wireless communications network in which the WAP terminal is operating.

14. The method of claim 13, wherein the WAP gateway obtains the prevailing position of the WAP terminal from a Mobile Switching Center (MSC) in the wireless communications network, and wherein the MSC obtains the prevailing position of the WAP terminal via one of a Global Positioning System (GPS) and a Mobile Positioning System (MPS).

15. The system of claim 1, wherein said WAP gateway modifies the request only when the tag is present.

16. The method of claim 8, wherein said step of modifying further comprises the step of:

modifying the request, at the gateway, to include user-specific information only when the tag is present in the request.

17. A WAP terminal comprising:

a transceiver for communicating a request for information available on the Internet over an air interface;

an input device for permitting a user to enter control input into the WAP terminal; and a processor for selectively appending a tag associated with user-specific information to said request for information available on the Internet based on said control input, wherein a WAP gateway, prior to forwarding the request from the WAP terminal to an origin server, can modify the request to include user-specific information when the tag is present.

18. The WAP terminal of claim 17, wherein the user-specific information is a calling-party number associated with the WAP terminal.

19. The WAP terminal of claim 17, wherein the user-specific information is a prevailing geographic position of the WAP terminal.

20. The WAP terminal of claim 19, wherein the request is a GET requests and wherein an origin server provides, in response to the GET request, content adapted to the prevailing position of the WAP terminal.

21. The WAP terminal of claim 19, wherein a WAP gateway obtains the prevailing position of the WAP terminal in response to receipt of said tag from a wireless communications network in which the WAP terminal is operating.

* * * * *

UNITED STATES PATENT AND TRADEMARK OFFICE
CERTIFICATE OF CORRECTION

PATENT NO.         : 6,865,171 B1
APPLICATION NO. : 09/639936
DATED                 : March 8, 2005
INVENTOR(S)       : Nilsson Page 1 of 1

It is certified that error appears in the above-identified patent and that said Letters Patent is hereby corrected as shown below:

In Column 6, Line 27, in Claim 1, after "wherein" delete "the" and insert -- a --, therefor.

In Column 6, Line 28, in Claim 1, after "terminal to" delete "the" and insert -- an --, therefor.

In Column 6, Line 28, in Claim 1, delete "modifies" and insert -- can modify --, therefor.

In Column 8, Line 21, in Claim 20, delete "requests" and insert -- request, --, therefor.

Signed and Sealed this

Twenty-sixth Day of August, 2008

JON W. DUDAS
*Director of the United States Patent and Trademark Office*